(12) United States Patent
Liu et al.

(10) Patent No.: US 12,454,217 B2
(45) Date of Patent: Oct. 28, 2025

(54) REAR-END COLLISION ALARM APPARATUS FEATURING REMOTE ALARMING

(71) Applicants: Cheng-Yu Liu, Keelung (TW);
Yi-Lung Kuo, Keelung (TW);
Siang-Yu He, Keelung (TW)

(72) Inventors: Cheng-Yu Liu, Keelung (TW);
Yi-Lung Kuo, Keelung (TW);
Siang-Yu He, Keelung (TW)

( * ) Notice: Subject to any disclaimer, the term of this patent is extended or adjusted under 35 U.S.C. 154(b) by 64 days.

(21) Appl. No.: 18/434,815

(22) Filed: Feb. 7, 2024

(65) Prior Publication Data

US 2025/0249828 A1    Aug. 7, 2025

(51) Int. Cl.
*B60Q 7/00*    (2006.01)

(52) U.S. Cl.
CPC ..................... *B60Q 7/00* (2013.01)

(58) Field of Classification Search
CPC ....................................................... B60Q 7/00
USPC ........................................................ 340/942
See application file for complete search history.

(56) References Cited

U.S. PATENT DOCUMENTS

| | | | |
|---|---|---|---|
| 7,230,546 B1* | 6/2007 | Nelson | G08G 1/0955 340/940 |
| 9,489,841 B1* | 11/2016 | Huggins | E01F 9/615 |
| 9,949,065 B1* | 4/2018 | Zarakas | H04L 63/0876 |
| 12,062,281 B1* | 8/2024 | Baker | G08G 1/091 |
| 2018/0203111 A1* | 7/2018 | Yu | B60Q 9/008 |
| 2023/0215258 A1* | 7/2023 | Selevan | G08B 5/006 340/933 |
| 2024/0150979 A1* | 5/2024 | Reckert | F21V 23/0471 |

* cited by examiner

*Primary Examiner* — Kerri L Mcnally
(74) *Attorney, Agent, or Firm* — Leong C. Lei

(57) ABSTRACT

A rear-end collision alarm apparatus featuring remote alarming is provided, including an alert detector device and an alert receiver device. The alert detector device is mounted on a preset warning object (such as a warning triangle and a cone). The alert receiver device is worn on or carried by a user. The alert detector device includes a first light source module, an infrared detection module, and a first Bluetooth module. The alert detector device is placeable, together with the warning object, at a predetermined remote distance from a traffic accident or construction site, where the first light source module may serve as a warning through light flashing. When the infrared detection module detects an object entering a detection range, the alert detector device transmits an alert signal through the first Bluetooth module to the alert receiver device to have the alert receiver device instantaneously emit alarming light and alarming sounds.

6 Claims, 6 Drawing Sheets

REAR-END COLLISION ALARM APPARATUS FEATURING REMOTE ALARMING

BACKGROUND OF THE INVENTION

(a) Technical Field of the Invention

The present invention relates to a rear-end collision alarm apparatus featuring remote alarming, and more particularly to an arrangement that comprises an alert detector device mounted to a preset warning object (such as: a warning triangle or a cone, or the likes) and placeable, together with the warning object, at a predetermined remote distance from a traffic accident or construction site, and an alert receiver device wearable on or carriable by a user, where the alert detector device comprises an infrared detection module to implement detection so that when an object is detected entering a detection range, the alert detector device transmits an alert signal to the alert receiver device to have the alert receiver device instantaneously exhibit alarming flashing light and give off alarming sounds, in order to achieve pre-alarming for a user staying in front of the warning object to get aware of an object approaching from the rear side to thereby provide an effect time interval for buffering and conducting an avoiding operation (an instantaneous dodging measure) to ensure the safety of the user staying in front of the warning object.

(b) Description of the Prior Art

Traffic and road construction has been maturely developed, and automobiles become the best way of transportation for the modern people. Consequently, the number of automobiles is increased year by year, and the occurrence of traffic accidents is correspondingly increased. When a traffic accident takes place, to signal other drivers to detour, in order to effectively prevent secondary collision and to keep lives safe and maintain normal traffic, as shown in FIG. 1, traffic regulations require a warning triangle B be placed at a distance (which may be around 50-100 meters) away from the back side of a vehicle A involved in the traffic accident in order to achieve an effect of alarming.

Further, in a road construction side or a building construction site, to ensure driving safety and to keep construction personnel safe, it is commonplace to set up a cone (a traffic cone) around the construction site or at a location in front of or behind the construction location to attract the drivers' attention in order to prevent unnecessary accidents due to mistakenly rush into the construction site resulting from poor eyesight or negligence.

However, although the conventionally used warning triangle B or the known cone (traffic cone) is commonly attached with reflecting sticks, such reflecting sticks are generally passively reflecting light, and must be first irradiated with external light before they can reflect the light. This makes the time that a drive may have to react upon observing the reflected light insufficient. Particularly, light emitting from an automobile head light may get diffracted in a rainy condition, and this makes the reflection of light poor and drivers may easily neglect the warning triangle B or the cone (traffic cone). This makes it not possible to ensure people who are located in front of or behind the warning triangle B or the cone (traffic cone).

SUMMARY OF THE INVENTION

A rear-end collision alarm apparatus featuring remote alarming disclosed according to the present invention comprises an alert detector device and an alert receiver device.

The alert detector device is mounted on a preset warning object (such as: a warning triangle or a cone, and the likes) and comprising a first control circuit module, a first light source module, an infrared detection module, a first Bluetooth module, a first battery module, and a horizon switch. The first control circuit module is operable for signal processing. The first light source module is in electrical connection with the first control circuit module for exhibiting alarming light. The infrared detection module is in electrical connection with the first control circuit module for detection of an object with in a predetermined distance and range, so as to generate, upon detecting the object, a detection signal to be transmitted to the first control circuit module. The first Bluetooth module is in electrical connection with the first control circuit module for wireless signal connection and transmission. The first battery module is in electrical connection with the first control circuit module for supply of electrical power to the first control circuit module, the first light source module, the infrared detection module, and the first Bluetooth module. Further, the first control circuit module comprises a horizon switch, and the horizon switch is operable to detect whether or not the alert detector device is in a verticality state. When the alert detector device is in a non-verticality state (an inclined or tipped-down state), the horizon switch and the first control circuit module are set in OFF states.

The alert receiver device is wearable on the user and is paired with and connected with the alert detector device by means of wireless signals, and comprises a second control circuit module, a second light source module, a loud speaker, a second Bluetooth module, and a second battery module. The second control circuit module is operable for signal processing. The second light source module is in electrical connection with the second control circuit module. The loud speaker is in electrical connection with the second control circuit module. The second Bluetooth module is in electrical connection with the second control circuit module and is pairable with the first Bluetooth module for wireless signal transmission. The second battery module is in electrical connection with the second control circuit module for supply of electrical power to the second control circuit module, the second light source module, the loud speaker, and the second Bluetooth module.

In case that the alert detector device is set to implement a first detection mode, the setting buttons of the first control circuit module are operable to activate the first detection mode, and the first control circuit module activates the infrared detection module and establishes signal connection with the second control circuit module of the alert receiver device through Bluetooth transmission. When the infrared detection module detects an object entering the detection range, the infrared detection module generates a detection signal transmitted to the first control circuit module, and the first control circuit module, upon receiving the detection signal, generates an alert signal transmitted through the first Bluetooth module to the second Bluetooth module, and then, the second Bluetooth module transmits the alert signal to the second control circuit module to have the second control circuit module of the alert receiver device control the second light source module to exhibit alarming flashing and also control the loud speaker to give off alarming sounds. Further, in case that the warning object is hit to tip down, meaning the alert detector device is in a non-verticality state (an inclined or tipped-down state), the horizon switch is set OFF and controls the first control circuit module to be in an OFF state, and under this condition, the Bluetooth signaling between the first Bluetooth module of the alert detector device and the second Bluetooth module of the alert receiver device is interrupted, indicating the warning object and the alert detector device are hit and tipped down, the second control circuit module of the alert receiver device controls the second light source module to exhibit alarming flashing and also controls the loud speaker to give off alarming sounds.

In case that the alert detector device is set to implement a second detection mode, the setting buttons of the first control circuit module are operable to activate the second detection mode, and the first control circuit module deactivates the infrared detection module and establishes signal connection with the second control circuit module of the alert receiver device through Bluetooth transmission. In case that the warning object is hit to tip down, meaning the alert detector device is in a non-verticality state (an inclined or tipped-down state), the horizon switch is set OFF and controls the first control circuit module to be in an OFF state, and under this condition, the Bluetooth signaling between the first Bluetooth module of the alert detector device and the second Bluetooth module of the alert receiver device is interrupted, indicating the warning object and the alert detector device are hit and tipped down, the second control circuit module of the alert receiver device controls the second light source module to exhibit alarming flashing and also controls the loud speaker to give off alarming sounds.

DETAILED DESCRIPTION OF THE PREFERRED EMBODIMENTS

Figure 1:
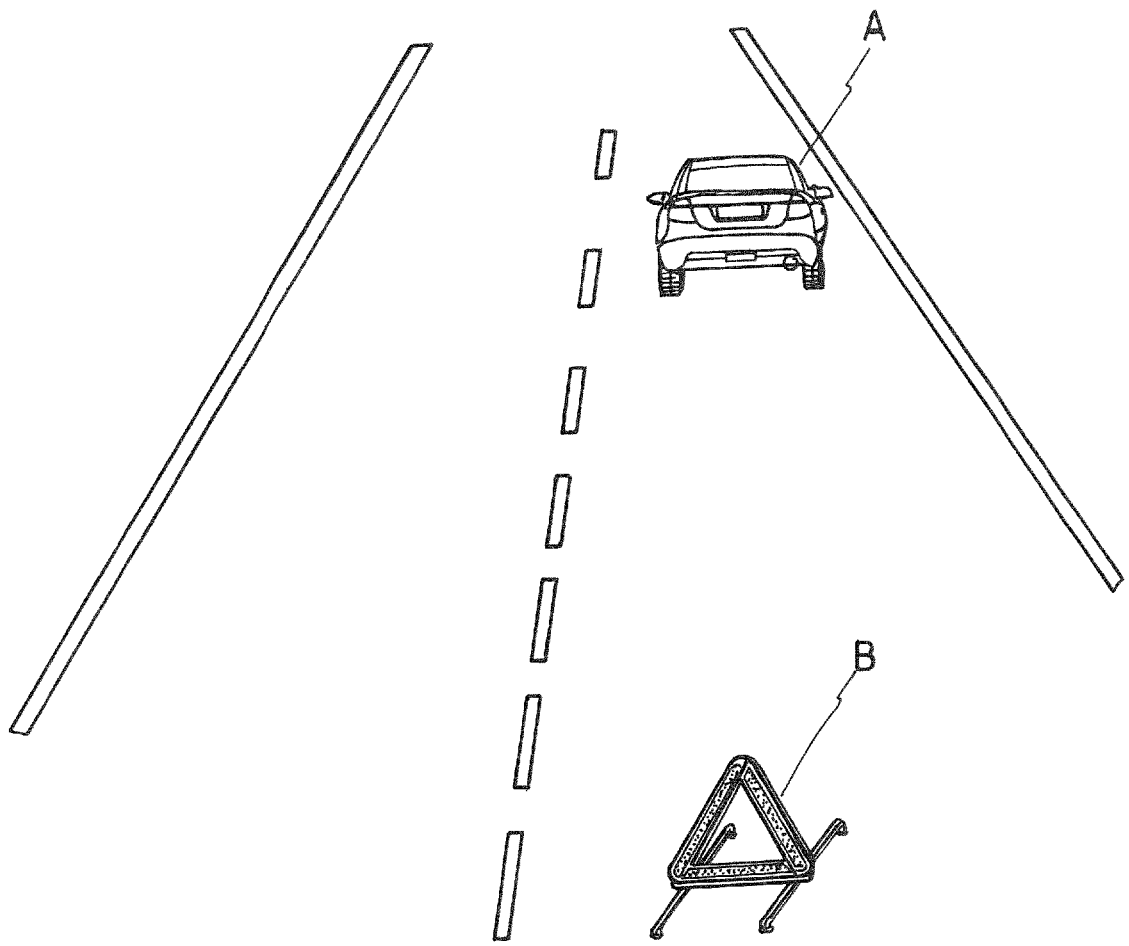
FIG. 1 is a schematic view showing application of a conventional warning triangle.

Referring to FIGS. 2-6, the present invention discloses a rear-end collision alarm apparatus featuring remote alarming, which comprises an alert detector device 1 and an alert receiver device 2.

The alert detector device 1 is mounted on a pre-installed warning object 3 (such as: a warning triangle, a cone, or a construction site warning sign, and the likes) and comprises: a first control circuit module 11, a first light source module 12, an infrared detection module 13, a first Bluetooth module 14, and a first battery module 15. The first control circuit module 11 is arranged in an interior of the alert detector device 1 for signal processing. The first light source module 12 is in electrical connection with the first control circuit module 11 for exhibiting alarming light. The infrared detection module 13 is in electrical connection with the first control circuit module 11 for detection of an object within a predetermined distance and range so as to generate, upon detecting an object, a detection signal to be then transmitted to the first control circuit module 11, such as: the infrared detection module 13 having a detection distance of 150 meters and a detection angle range of 60 degrees. The first Bluetooth module 14 is in electrical connection with the first control circuit module 11 for wireless signal connection and transmission. The first battery module 15 is in electrical connection with the first control circuit module 11 for supply of electrical power to the first control circuit module 11, the first light source module 12, the infrared detection module 13, and the first Bluetooth module 14.

The first control circuit module 11 further comprises a horizon switch 111, in order to detect, by means of the horizon switch 111, whether or not the alert detector device 1 is in a verticality state. If the alert detector device 1 is in a non-verticality state (an inclined or tipped-down state), the horizon switch 111 is set OFF and controls the first control circuit module 11 and the first Bluetooth module 14 to be in an OFF state.

The first control circuit module 11 further comprises a plurality of setting buttons 112, and the plurality of setting buttons 112 are operable to control the alert detector device 1 with respect to activation/deactivation of the first control circuit module 11, a lighting mode of the first light source module 12 (such as: persistent lighting or flashing mode, and the likes), and setting and switching of the first control circuit module 11 to preset first detection mode or second detection mode.

The alert receiver device 2 is worn on or carried by a user 5 and is paired and connected with the alert detector device 1 by means of wireless signals. The alert receiver device 2 comprises a second control circuit module 21, a second light source module 22, a loud speaker 23, a second Bluetooth module 24, and a second battery module 25. The second control circuit module 21 is arranged in an interior of the alert receiver device 2 for signal processing. The second light source module 22 is in electrical connection with the second control circuit module 21. The loud speaker 23 is in electrical connection with the second control circuit module 21. The second Bluetooth module 24 is in electrical connection with the second control circuit module 21 and is pairable with the first Bluetooth module 14 of the alert detector device 1 for connection and transmission through wireless signals. The second battery module 25 is in electrical connection with the second control circuit module 21 for supply of electrical power to the second control circuit module 21, the second light source module 22, the loud speaker 23, and the second Bluetooth module 24.

When the first control circuit module 11 receives the detection signal generated by the infrared detection module 13, the first control circuit module 11 generates an alert signal that is transmitted through the first Bluetooth module 14 to the second Bluetooth module 24 and the second Bluetooth module 24 then transmits the alert signal to the second control circuit module 21 to have the second control circuit module 21 of the alert receiver device 2 control the second light source module 22 to exhibit alarming flashing and also control the loud speaker 23 to give off alarming sounds.

When the first control circuit module 11 and the second control circuit module 21 are activated, the first Bluetooth module 14 automatically pairs with and connects with the second Bluetooth module 24. In case that the second control circuit module 21 does not yet receive a signal from the first Bluetooth module 14, meaning Bluetooth signaling between the first Bluetooth module 14 and the second Bluetooth module 24 is interrupted, the second control circuit module 21 of the alert receiver device 2 controls the second light source module 22 to exhibit alarming flashing and also control the loud speaker 23 to give off alarming sounds.

The alert receiver device 2 can be a single warning-issuing device or a combination of multiple warning-issuing devices, or alternatively, the alert receiver device 2 can be a single smart phone or a combination of multiple smart phones, meaning the second control circuit module 21, the second light source module 22, the loud speaker 23, the second Bluetooth module 24, and the second battery module 25 are respectively equivalent to a control circuit, a flashlight LED lamp, a Bluetooth transmission module, and an internally mounted battery of the smart phone.

The first battery module 15 and the second battery module 25 can each be an externally mounted battery or a rechargeable battery.

Figure 2:
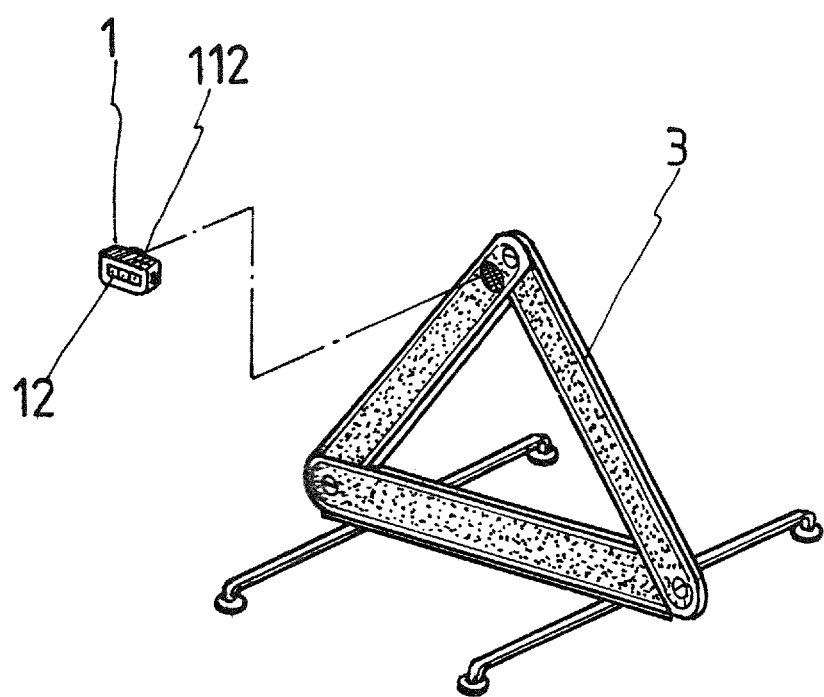
FIG. 2 is a schematic view showing a rear-end collision alarm apparatus featuring remote alarming according to a first embodiment of the present invention.
Figure 3:
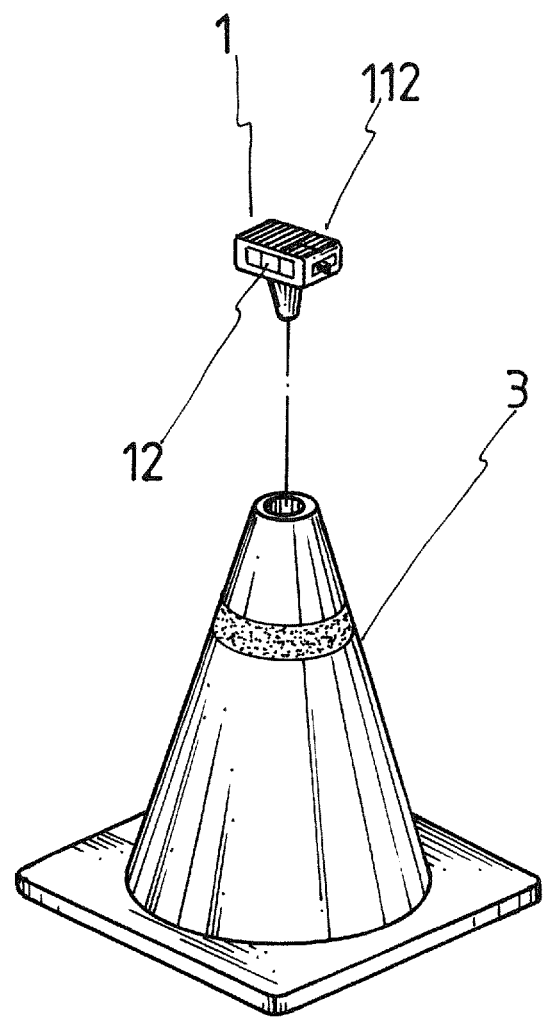
FIG. 3 is a schematic view showing a rear-end collision alarm apparatus featuring remote alarming according to a second embodiment of the present invention.
Figure 4:
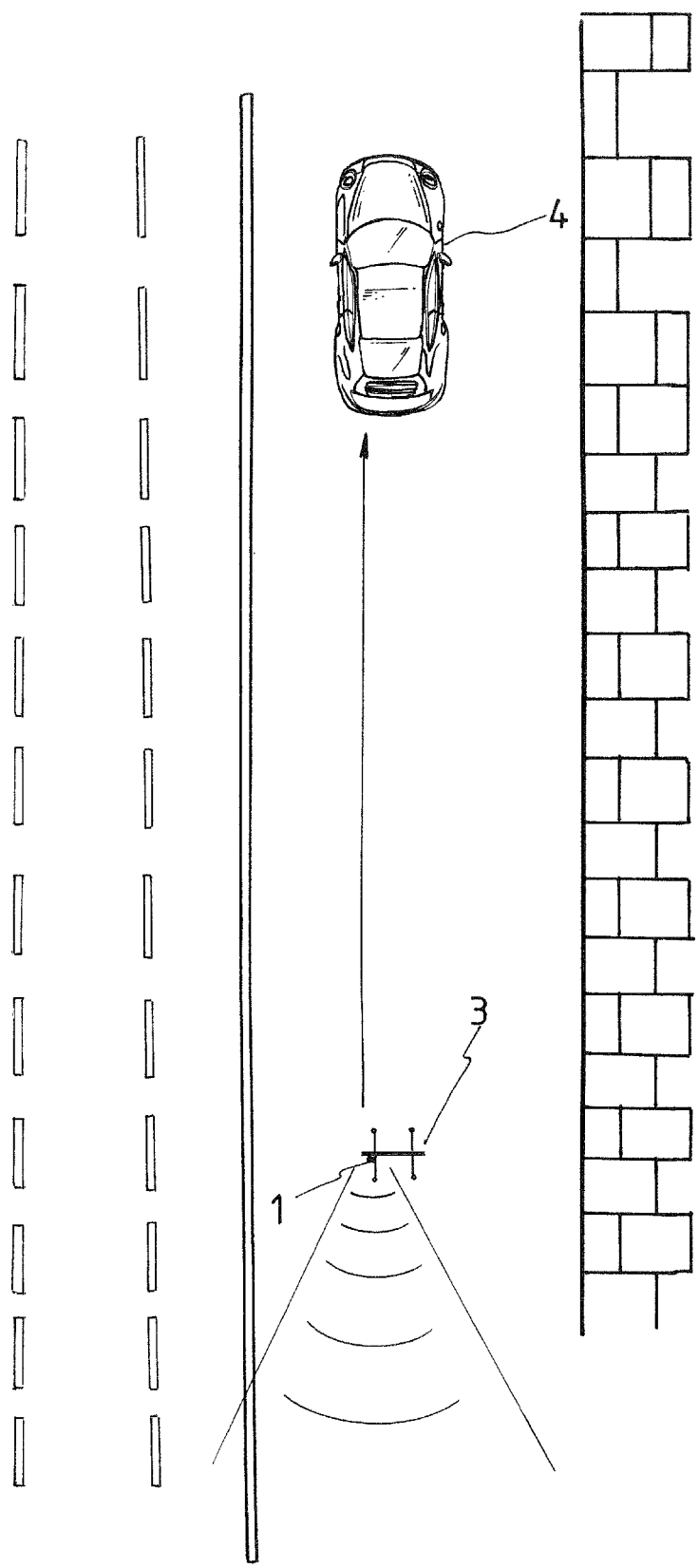
FIG. 4 is a schematic view showing a first example of application of the rear-end collision alarm apparatus featuring remote alarming according to the present invention.
Figure 5:
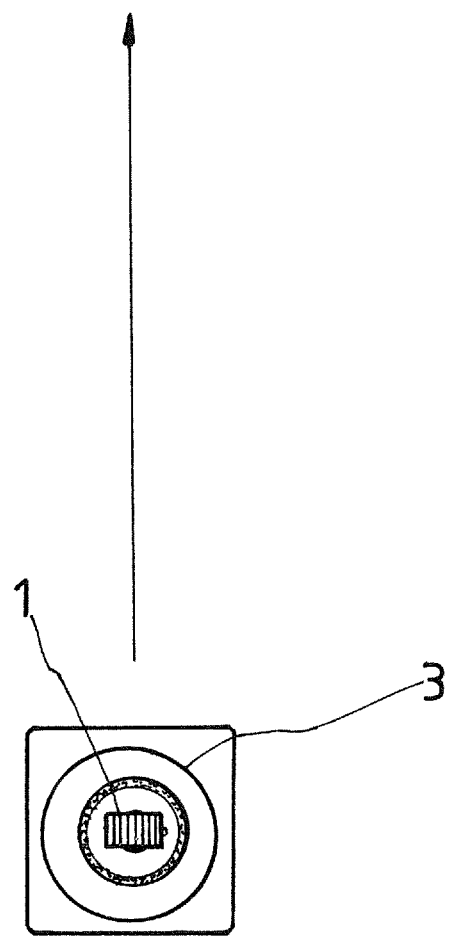
FIG. 5 is a schematic view showing a second example of application of the rear-end collision alarm apparatus featuring remote alarming according to the present invention.
Figure 6:
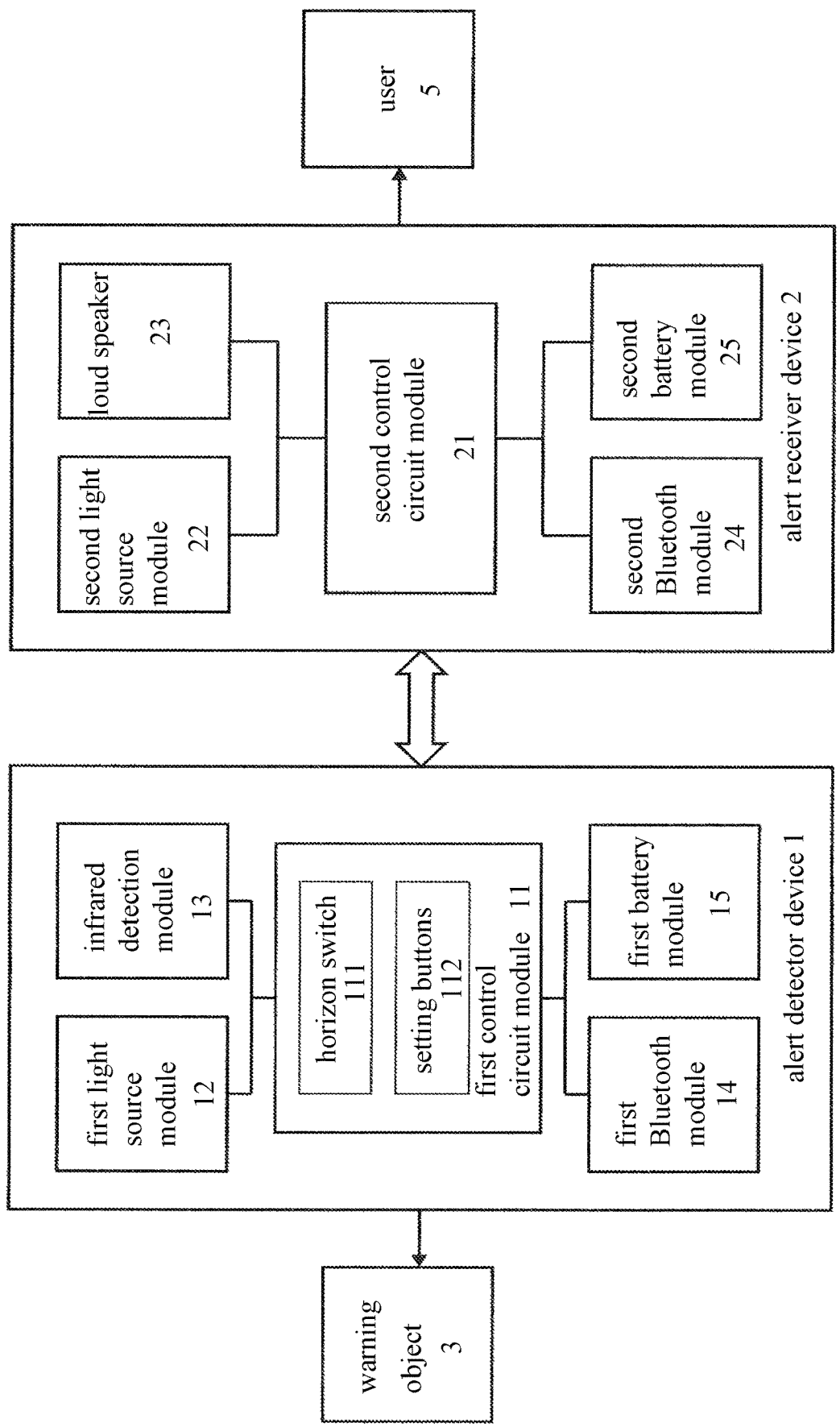
FIG. 6 is a schematic view showing architecture of the rear-end collision alarm apparatus featuring remote alarming according to the present invention.

The warning object 3 can be a car-carrying warning triangle, a cone (traffic cone) or a construction site warning sign, and the likes, such as: for the warning object 3 being a warning triangle, the alert detector device 1 can be mounted to a high location of a front side thereof (as shown in FIG. 2) and facing the direction in which a vehicle is moving (as shown in FIG. 4); or such as: for the warning object 3 being a warning triangle, the alert detector device 1 can be mounted to a high location of a front side thereof (as shown in FIG. 3) and facing the direction in which a vehicle is moving (as shown in FIG. 5).

A first example of application of the present invention will be described as follows, and for example, on a highway (expressway), in case that a vehicle 4 malfunctions or encounters other accidents, it needs to place the warning object 3 at a rear side of the vehicle 4 for a predetermined distance (such as: 50-100 meters), and the alert detector device 1 faces the direction in which other vehicles are moving (as shown in FIG. 4). When the alert detector device 1 is activated, the first Bluetooth module 14 automatically pairs with and connects with the second Bluetooth module 24 of the alert receiver device 2, and the first detection mode of the first control circuit module 11 is activated by means of the setting buttons 112 and the first light source module 12 is activated for alarming flashing. When the alert detector device 1 is operated with the first detection mode, the first control circuit module 11 activates the infrared detection module 13 and sets up signal connection with the second control circuit module 21 of the alert receiver device 2 through Bluetooth transmission, and under this condition, if the infrared detection module 13 detects an object (a vehicle) entering the detection range, the infrared detection module 13 generates the detection signal that is transmitted to the first control circuit module 11, and the first control circuit module 11, upon receiving the detection signal, generates an alert signal for being transmitted through the first Bluetooth module 14 to the second Bluetooth module 24 to allow the second Bluetooth module 24 to subsequently transmit the alert signal to the second control circuit module 21, so as to have the second control circuit module 21 of the alert receiver device 2 control the second light source module 22 to exhibit alarming flashing and also control the loud speaker 23 to give off alarming sounds.

When the alert detector device 1 is operated with the first detection mode, in case that the warning object 3 is hit down (or damaged), meaning the alert detector device 1 is in a non-verticality state (an inclined or tipped-down state), the horizon switch 111 is set OFF and controls the first control circuit module 11 and the first Bluetooth module 14 to be in an OFF state, and under this condition, the Bluetooth signaling between the first Bluetooth module 14 of the alert detector device 1 and the second Bluetooth module 24 of the alert receiver device 2 is interrupted, indicating the warning object 3 and the alert detector device 1 are hit and become inclined or tipped down, the second control circuit module 21 of the alert receiver device 2 controls the second light source module 22 to exhibit alarming flashing and also controls the loud speaker 23 to give off alarming sounds.

A second example of application of the present invention will be described as follows, and for example in a regular surface road (non-expressway), a user 5 at a construction site may set up the warning object 3 at a front side or a rear side of the periphery of the construction site and a working location for a predetermined distance (such as: 50 meters, as shown in FIG. 5). When the alert detector device 1 is activated, the first Bluetooth module 14 automatically pairs with and connects with the second Bluetooth module 24 of the alert receiver device 2, and the second detection mode of the first control circuit module 11 is activated by means of the setting buttons 112 and the first light source module 12 is activated for alarming flashing. When the alert detector device 1 is operated with the second detection mode, the first control circuit module 11 deactivates the infrared detection module 13 and sets up signal connection with the second control circuit module 21 of the alert receiver device 2 through Bluetooth transmission, and under this condition, if the warning object 3 is hit to incline or tip down, meaning the alert detector device 1 is in a non-verticality state (an inclined or tipped-down state), the horizon switch 111 is set OFF and controls the first control circuit module 11 and the first Bluetooth module 14 to be in an OFF state, and under this condition, the Bluetooth signaling between the first Bluetooth module 14 of the alert detector device 1 and the second Bluetooth module 24 of the alert receiver device 2 is interrupted, indicating the warning object 3 and the alert detector device 1 are hit and become inclined or tipped down, the second control circuit module 21 of the alert receiver device 2 controls the second light source module 22 to exhibit alarming flashing and also controls the loud speaker 23 to give off alarming sounds.

Thus, the technical features of the present invention reside on that an alert detector device 1 is attached to a preset warning object 3, and is arranged, in combination with the warning object 3, at a predetermined remote distance from a traffic-accident-involved vehicle or a construction site, and an alert receiver device 2 is worn on or attached to the body of a user 5, so that an infrared detection module 13 arranged in the alert detector device 1 may detect an object entering a detection range and the alert detector device 1 transmits an alert signal to the alert receiver device 2 to have the alert receiver device 2 instantaneously exhibit alarming flashing light and give off alarming sounds; or, in case that Bluetooth signaling between the alert detector device 1 and the alert receiver device 2 is interrupted, the alert receiver device 2, similarly, instantaneously exhibits alarming flashing light and gives off alarming sounds, in order to achieve pre-alarming for a user 5 staying in front of the warning object 3 to get aware of an object approaching from the rear side to thereby provide an effect time interval for buffering and conducting an instantaneous dodging measure to thereby ensure the safety of the user 5 staying in front of the warning object.

We claim:

1. A rear-end collision alarm apparatus featuring remote alarming, comprising:
a first control circuit module, which is operable for signal processing;

an alert detector device, which is mounted on a preset warning object, the alert detector device comprising:

a first light source module, which is in electrical connection with the first control circuit module for exhibiting alarming light;

an infrared detection module, which is in electrical connection with the first control circuit module for detection of an object with in a predetermined distance and range, so as to generate, upon detecting the object, a detection signal to be transmitted to the first control circuit module;

a first Bluetooth module, which is in electrical connection with the first control circuit module for wireless signal connection and transmission; and a first battery module, which is in electrical connection with the first control circuit module for supply of electrical power to the first control circuit module, the first light source module, the infrared detection module, and the first Bluetooth module; and an alert receiver device, which is adapted to be worn on or carried by a user and is pairable and connectable with the alert detector device by means of wireless signals, the alert receiver device comprising:

a second control circuit module, which is operable for signal processing;

a second light source module, which is in electrical connection with the second control circuit module;

a loud speaker, which is in electrical connection with the second control circuit module;

a second Bluetooth module, which is in electrical connection with the second control circuit module and is pairable with the first Bluetooth module for connection and transmission through wireless signals; and a second battery module, which is in electrical connection with the second control circuit module for supply of electrical power to the second control circuit module, the second light source module, the loud speaker and the second Bluetooth module;

wherein the first control circuit module further comprises a horizon switch, and the horizon switch is operable to detect whether or not the alert detector device is in a verticality state; and when the alert detector device is not in the verticality state, the horizon switch is set OFF and controls the first control circuit module and the first Bluetooth module to be in an OFF state.

2. The rear-end collision alarm apparatus featuring remote alarming according to claim 1, wherein in case that the second control circuit module does not receive a signal from the first Bluetooth module of the alert detector device, the second control circuit module of the alert receiver device controls the second light source module to exhibit alarming flashing and also controls the loud speaker to give off alarming sounds.

3. The rear-end collision alarm apparatus featuring remote alarming according to claim 1, wherein when the first control circuit module and the second control circuit module are activated, the first Bluetooth module automatically pairs with and connects with the second Bluetooth module.

4. The rear-end collision alarm apparatus featuring remote alarming according to claim 1, wherein the alert receiver device comprises one of a single alert-issuing device or a combination of multiple alert-issuing devices and a single smart phone or a combination of multiple smart phones.

5. The rear-end collision alarm apparatus featuring remote alarming according to claim 1, wherein the first control circuit module further comprises a plurality of setting buttons, and the setting buttons are operable to control activation/deactivation of the first control circuit module and a lighting mode of the first light source module.

6. The rear-end collision alarm apparatus featuring remote alarming according to claim 1, wherein the first battery module and the second battery module are each one of an externally mounted battery and a rechargeable battery.

* * * * *